(12) United States Patent
Chacon et al.

(10) Patent No.: US 7,524,784 B2
(45) Date of Patent: *Apr. 28, 2009

(54) GLASSES FOR FLAT PANEL DISPLAYS

(75) Inventors: Lisa C. Chacon, Corning, NY (US);
Adam J. G. Ellison, Corning, NY (US);
George B. Hares, Corning, NY (US);
Jeffrey T. Kohli, Corning, NY (US);
Josef C. Lapp, Corning, NY (US);
Robert Morena, Caton, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/075,155

(22) Filed: Mar. 10, 2008

(65) Prior Publication Data

US 2008/0160221 A1 Jul. 3, 2008

Related U.S. Application Data

(63) Continuation of application No. 10/960,594, filed on Oct. 7, 2004, now Pat. No. 7,365,038, which is a continuation of application No. 09/990,750, filed on Nov. 16, 2001, now Pat. No. 6,831,029, which is a continuation of application No. 09/443,260, filed on Nov. 22, 1999, now Pat. No. 6,319,867.

(60) Provisional application No. 60/110,220, filed on Nov. 30, 1998.

(51) Int. Cl.
*C03C 3/091* (2006.01)

(52) U.S. Cl. .............................. 501/66; 501/70; 501/72; 428/428

(58) Field of Classification Search .................. 501/66, 501/70, 72; 428/428
See application file for complete search history.

(56) References Cited

U.S. PATENT DOCUMENTS

| | | | | |
|---|---|---|---|---|
| 2,231,811 | A | 2/1941 | Littleton et al. | 49/89 |
| 2,961,328 | A | 11/1960 | Babcock et al. | 106/52 |
| 3,338,696 | A | 8/1967 | Dockerty | 65/145 |
| 3,682,609 | A | 8/1972 | Dockerty | 65/83 |
| 4,394,453 | A | 7/1983 | Dumbaugh, Jr. | 501/66 |
| 4,824,808 | A | 4/1989 | Dumbaugh | 501/66 |
| 5,116,788 | A | 5/1992 | Dumbaugh | 501/66 |
| 5,244,847 | A | 9/1993 | Kushitani et al. | 501/66 |
| 5,374,595 | A | 12/1994 | Dumbaugh et al. | 501/66 |
| 5,506,180 | A | 4/1996 | Ponthieu | 501/66 |
| 5,508,237 | A | 4/1996 | Moffatt et al. | 501/69 |
| 5,770,535 | A | 6/1998 | Brix et al. | 501/67 |
| 5,801,109 | A | 9/1998 | Nishizawa et al. | 501/66 |
| 5,811,361 | A | 9/1998 | Miwa | 501/70 |
| 5,851,939 | A | 12/1998 | Miwa | 501/70 |
| 5,885,914 | A | 3/1999 | Nishizawa et al. | 501/66 |
| 6,060,168 | A | 5/2000 | Kohli | 501/66 |
| 6,096,670 | A | 8/2000 | Lautenschlager et al. | 501/67 |
| 6,169,047 | B1 | 1/2001 | Nishizawa et al. | 501/66 |
| 6,250,111 | B1 | 6/2001 | Murakami et al. | 65/134.9 |
| 6,319,867 | B1 | 11/2001 | Chacon et al. | 501/66 |
| 6,468,933 | B1 | 10/2002 | Narita et al. | 201/56 |
| 6,831,029 | B2 | 12/2004 | Chacon et al. | 501/66 |
| 7,365,038 | B2 * | 4/2008 | Chacon et al. | 501/66 |

FOREIGN PATENT DOCUMENTS

| | | |
|---|---|---|
| DE | 42 13 579 | 10/1992 |
| DE | 196 01 922 A1 | 7/1997 |
| EP | 714862 | 6/1996 |
| FR | 2675795 | 10/1992 |
| GB | 479173 | 1/1938 |
| JP | 60-2155547 | 10/1985 |
| JP | 64-83538 | 3/1989 |
| JP | 4-160030 | 6/1992 |
| JP | 4-325436 | 11/1992 |
| JP | 7-277763 | 10/1995 |
| JP | 8-034634 | 2/1996 |
| JP | 9-110460 | 4/1997 |
| JP | 9-156953 | 6/1997 |
| JP | 9-169538 | 6/1997 |
| JP | 10-025132 | 1/1998 |
| JP | 10-059741 | 3/1998 |
| JP | 10-072237 | 3/1998 |
| JP | 10-114538 | 5/1998 |
| JP | 10-130034 | 5/1998 |
| JP | 10-139467 | 5/1998 |
| JP | 10-231139 | 9/1998 |
| JP | 10-324526 | 12/1998 |
| JP | 11-043350 | 2/1999 |
| JP | 11-292563 | 10/1999 |
| JP | 11-310430 | 11/1999 |
| SU | 642265 | 1/1979 |
| WO | WO98/27019 | 6/1998 |

OTHER PUBLICATIONS

ASTM E 228-95, "Standard Test Method For Linear Thermal Expansion of Solid Materials With a Vitreous Silica Dilatometer," Annual Book of ASTM Standards, American Society for Testing and Materials, West Conshohocken PA, 1995, pp. 1-7.

* cited by examiner

*Primary Examiner*—Karl E Group
(74) *Attorney, Agent, or Firm*—Maurice M. Klee

(57) ABSTRACT

Glasses are disclosed which are used to produce substrates in flat panel display devices. The glasses exhibit a density less than about 2.45 gm/cm$^3$ and a liquidus viscosity greater than about 200,000 poises, the glass consisting essentially of the following composition, expressed in terms of mol percent on an oxide basis: 65-75 $SiO_2$, 7-13 $Al_2O_3$, 5-15 $B_2O_3$, 0-3 MgO, 5-15 CaO, 0-5 SrO, and essentially free of BaO. The glasses also exhibit a strain point exceeding 650° C.

20 Claims, No Drawings

GLASSES FOR FLAT PANEL DISPLAYS

CROSS-REFERENCE TO RELATED APPLICATIONS

This is a continuation of U.S. patent application Ser. No. 10/960,594 filed on Oct. 7, 2004, now U.S. Pat. No. 7,365,038, which is a continuation of U.S. application Ser. No. 09/990,750 filed on Nov. 16, 2001, now U.S. Pat. No. 6,831,029, which is a continuation of U.S. application Ser. No. 09/443,260 filed on Nov. 22, 1999, now U.S. Pat. No. 6,319,867. The contents of which are relied upon and incorporated herein by reference in their entirety and the benefit of priority under 35 U.S.C. § 120 is hereby claimed. This application also claims the benefit under 35 U.S.C. § 119(e) of U.S. Provisional Application No. 60/110,220 filed Nov. 30, 1998.

FIELD OF THE INVENTION

The present invention relates to alkali-free, aluminosilicate glasses exhibiting desirable physical and chemical properties for substrates in flat panel display devices.

BACKGROUND OF THE INVENTION

Displays may be broadly classified into one of two types: emissive (e.g., CRTs and plasma display panels (PDPs)) or non-emissive. This latter family, to which liquid crystal displays (LCDs) belong, relies upon an external light source, with the display only serving as a light modulator. In the case of liquid crystal displays, this external light source may be either ambient light (used in reflective displays) or a dedicated light source (such as found in direct view displays).

Liquid crystal displays rely upon three inherent features of the liquid crystal (LC) material to modulate light. The first is the ability of the LC to cause the optical rotation of polarized light. Second, is the ability of the LC to establish this rotation by mechanical orientation of the liquid crystal. The third feature is the ability of the liquid crystal to undergo this mechanical orientation by the application of an external electric field.

In the construction of a simple, twisted nematic (TN) liquid crystal display, two substrates surround a layer of liquid crystal material. In a display type known as Normally White, the application of alignment layers on the inner surface of the substrates creates a 90° spiral of the liquid crystal director. This means that the polarization of linearly polarized light entering one face of the liquid crystal cell will be rotated 90° by the liquid crystal material. Polarization films, oriented 90° to each other, are placed on the outer surfaces of the substrates.

Light, upon entering the first polarization film, becomes linearly polarized. Traversing the liquid crystal cell, the polarization of this light is rotated 90° and is allowed to exit through the second polarization film. Application of an electric field across the liquid crystal layer aligns the liquid crystal directors with the field, interrupting its ability to rotate light. Linearly polarized light passing through this cell does not have its polarization rotated and hence is blocked by the second polarization film. Thus, in the simplest sense, the liquid crystal material becomes a light valve, whose ability to allow or block light transmission is controlled by the application of an electric field.

The above description pertains to the operation of a single pixel in a liquid crystal display. High information type displays require the assembly of several million of these pixels, which are referred to as sub pixels, into a matrix format. Addressing, or applying an electric field to, all of these sub pixels while maximizing addressing speed and minimizing cross-talk presents several challenges. One of the preferred ways to address sub pixels is by controlling the electric field with a thin film transistor located at each sub pixel, which forms the basis of active matrix liquid crystal display devices (AMLCDs).

The manufacturing of these displays is extremely complex, and the properties of the substrate glass are extremely important. First and foremost, the glass substrates used in the production of AMLCD devices need have their physical dimensions tightly controlled. The downdraw sheet or fusion process, described in U.S. Pat. No. 3,338,696 (Dockerty) and U.S. Pat. No. 3,682,609 (Dockerty), is one of the few capable of delivering such product without requiring costly post forming finishing operations, such as lapping and polishing. Unfortunately, the fusion process places rather severe restrictions on the glass properties, requiring relatively high liquidus viscosities, preferably greater than 200,000 poises.

Typically, the two substrates that comprise the display are manufactured separately. One, the color filter plate, has a series of red, blue, green, and black organic dyes deposited on it. Each of these primary colors must correspond precisely with the pixel electrode area of the companion, active, plate. To remove the influence of differences between the ambient thermal conditions encountered during the manufacture of the two plates, it is desirable to use glass substrates whose dimensions are independent of thermal condition (i.e., glasses with lower coefficients of thermal expansion). However, this property needs to be balanced by the generation of stresses between deposited films and the substrates that arise due to expansion mismatch. It is estimated that an optimal coefficient of thermal expansion is in the range of $28\text{-}33 \times 10^{-7}/°$ C.

The active plate, so called because it contains the active, thin film transistors, is manufactured using typical semiconductor type processes. These include sputtering, CVD, photolithography, and etching. It is highly desirable that the glass be unchanged during these processes. Thus, the glass needs to demonstrate both thermal and chemical stability.

Thermal stability (also known as thermal compaction or shrinkage) is dependent upon both the inherent viscous nature of a particular glass composition (as indicated by its strain point) and the thermal history of the glass sheet as determined by the manufacturing process. U.S. Pat. No. 5,374,595, disclosed that glass with a strain point in excess of 650° C. and with the thermal history of the fusion process will have acceptable thermal stability for active plates based both on a-Si thin film transistors (TFTs) and super low temperature p-Si TFTs. Higher temperature processing (such as required by low temperature p-Si TFTs) may require the addition of an annealing step to the glass substrate to ensure thermal stability.

Chemical stability implies a resistance to attack of the various etchant solutions used in the manufacture processes. Of particular interest is a resistance to attack from the dry etching conditions used to etch the silicon layer. To benchmark the dry etch conditions, a substrate sample is exposed to an etchant solution known as 110BHF. This test consists of immersing a sample of glass in a solution of 1 volume of 50 wt. % HF and 10 volumes 40 wt. % $NH_4F$ at 30° C. for 5 minutes. The sample is graded on weight loss and appearance.

In addition to these requirements, AMLCD manufacturers are finding that both demand for larger display sizes and the economics of scale are driving them to process larger sized pieces of glass. Current industry standards are Gen III (550 mm×650 mm) and Gen III.5 (600 mm×720 mm), but future efforts are geared toward Gen IV (1 m×1 m) sizes, and potentially larger sizes. This raises several concerns. First and foremost is simply the weight of the glass. The 50+% increase in glass weight in going from Gen III.5 to Gen IV has significant implications for the robotic handlers used to ferry the glass into and through process stations. In addition, elastic sag, which is dependent upon glass density and Young's Modulus, becomes more of an issue with larger sheet sizes impacting the ability to load, retrieve, and space the glass in the cassettes used to transport the glass between process stations.

Accordingly, it would be desirable to provide a glass composition for display devices having a low density to alleviate difficulties associated with larger sheet size, preferably less than 2.45 g/cm$^3$ and a liquidus viscosity greater than about 200,000 poises. In addition, it would be desirable for the glass to have thermal expansion between about $28-35 \times 10^{-7}/°$ C., and preferably between about $28-33 \times 10^{-7}/°$ C., over the temperature range of 0-300° C. Furthermore, it would be advantageous for the glass to have a strain point greater than 650° C., and for the glass to be resistant to attack from etchant solutions.

SUMMARY OF THE INVENTION

The present invention is founded in the discovery of glasses exhibiting densities less than 2.45 g/cm$^3$ and a liquidus viscosity (defined as the viscosity of the glass at the liquidus temperature) greater than about 200,000 poises, preferably greater than about 400,000 poises, more preferably greater than about 600,000 poises, and most preferably greater than about 800,000 poises. Additionally, the glasses of the present invention exhibit linear coefficients of thermal expansion over the temperature range of 0-300° C. between about $28-35 \times 10^{-7}/°$ C., and preferably between about $28-33 \times 10^{-7}/°$ C., and strain points higher than about 650° C. The glass of the present invention has a melting temperature less than about 1700° C. In addition, the glass exhibits a weight loss of less than about 0.5 mg/cm$^2$ after immersion in a solution of 1 part HF 50 wt. % and 10 parts 40% wt. % NH$_4$F for 5 minutes at 30° C.

The glass of the present invention has a composition consisting essentially of the following composition as calculated in mole percent on an oxide basis: 65-75 SiO$_2$, 7-13 Al$_2$O$_3$, 5-15 B$_2$O$_3$, 0-3 MgO, 5-15 CaO, 0-5 SrO, and essentially free of BaO. More preferably, the glass of the present invention has a composition consisting essentially of the following composition as calculated in mole percent on an oxide basis: 67-73 SiO$_2$, 8-11.5 Al$_2$O$_3$, 8-12 B$_2$O$_3$, 0-1 MgO, 5.5-11 CaO, and 0-5 SrO.

We have discovered that for glasses having the compositions and physical properties discussed above, especially the preferred compositions and preferred properties, the liquidus viscosity of the glass is strongly influenced by the ratio of the sum of alkaline earths, RO (R=Mg, Ca, Sr) to alumina on a mol % basis, or RO/Al$_2$O$_3$=(MgO+CaO+SrO)/Al$_2$O$_3$. This ratio is referred to as RO/Al$_2$O$_3$, and should be held in the range 0.9 to 1.2. Most preferably, this range should be 0.92<RO/Al$_2$O$_3$<0.96 to obtain the highest liquidus viscosity.

The glasses of the present invention are essentially free of BaO, which means that the glasses preferably contain less than about 0.1 mol % BaO. The glasses of the invention are also essentially free of alkali metal oxides, which means that the glasses preferably contain a total of less than about 0.1 mol % of alkali metal oxides. Additionally, these glasses may contain fining agents (such as the oxides of arsenic, antimony, cerium, tin, and/or the halides, chlorine/fluorine).

In another aspect of the invention, the glasses have a melting temperature less than about 1700° C. The glasses of the present invention also exhibit a weight loss of less than 0.5 mg/cm$^2$ after immersion in a solution of 1 part 50 wt. % HF and 10 parts 40% wt. % NH$_4$F for 5 minutes at 30° C. The glasses are useful as a substrate for flat panel displays. Substrates made from the glass of the present invention have an average surface roughness as measured by atomic force microscopy of less than about 0.5 nm and an average internal stress as measured by optical retardation of less than about 150 psi.

DETAILED DESCRIPTION OF THE INVENTION

The present invention is concerned with improved glasses for use as flat panel display substrates. In particular, the glasses meet the various property requirements of such substrates.

The preferred glasses in accordance with the present invention exhibit a density of less than about 2.45 gm/cm$^3$, preferably less than about 2.40 gm/cm$^3$, a CTE over the temperature range of 0-300° C. between about $28-35 \times 10^{-7}/°$ C., preferably between about $28-33 \times 10^{-7}/°$ C., and strain points higher than about 650° C., preferably greater than 660° C. A high strain point is desirable to help prevent panel distortion due to compaction/shrinkage during subsequent thermal processing.

For more demanding manufacturing conditions such as the fusion process, described in U.S. Pat. No. 3,338,696 (Dockerty) and U.S. Pat. No. 3,682,609 (Dockerty), a glass having a high liquidus viscosity is required. Therefore, in a preferred embodiment of the present invention, the glasses should exhibit a density less than about 2.45 gm/cm$^3$ and a liquidus viscosity greater than about 200,000 poises, preferably greater than about 400,000 poises, more preferably greater than about 600,000 poises, and most preferably greater than about 800,000 poises. Although substrates made from glass of the present invention can be made using other manufacturing processes such as the float process, the fusion process is preferred for several reasons. First, glass substrates made from the fusion process do not require polishing. Current glass substrate polishing is capable of producing glass substrates having an average surface roughness greater than about 0.5 nm (Ra), as measured by atomic force microscopy. Glass substrates produced according to the present invention and using the fusion process have an average surface roughness as measured by atomic force microscopy of less than 0.5 nm.

Chemical durability involves a resistance to attack of the various etchant solutions used in the manufacture processes. Of particular interest is a resistance to attack from the dry etching conditions used to etch the silicon layer. One benchmark of the dry etch conditions is exposure to a etchant solution known as 110BHF. This test consists of immersing a sample of glass in a solution of 1 volume of 50 wt. % HF and 10 volumes 40 wt. % NH$_4$F at 30° C. for 5 minutes. Chemical resistance is determined by measuring weight loss in terms of mg/cm$^2$. This property is listed in Table I as "110 BHF."

The glasses of the present invention include 65-75 mol %, preferably 67-73 mol %, SiO$_2$ as the primary glass former. Increasing silica improves the liquidus viscosity and reduces the density and CTE of the glass, but excessive silica is detrimental to the melting temperatures. The glasses also comprise 7-13 mol %, preferably 8-11.5 mol %, Al$_2$O$_3$. Increases in Al$_2$O$_3$ content increase glass durability and decrease CTE, but liquidus temperatures increase. At least 8 mol % is required to have the most desired strain point; however, more than 11.5 mol % results in a less than desired liquidus temperature.

The glasses further include 5-15 mol %, preferably 8-12 mol % boric oxide. Boric oxide lowers the liquidus temperature and density and preferably is present in at least 8 mol %; however, more than 12 mol % boric oxide will negatively impact the glass strain point.

MgO is present in the glasses of the present invention in an amount of 0-3 mol %, preferably 0-1 mol %. Increasing MgO decreases liquidus viscosity, and therefore, no more than 3 mol % MgO should be present in the glass. However, smaller amounts of MgO may be beneficial for reducing density.

CaO is useful to lower both the melting and liquidus temperatures of the glass; however, more than 11 mol % will result in a less than desired strain point and a higher than desired coefficient of thermal expansion. Therefore, the glasses of the present invention can include 5-15 mol % CaO, but preferably include 5.5-11 mol % CaO.

The $RO/Al_2O_3$ ratio is in the range 0.9-1.2. Within this range local minima in liquidus temperature can be found, corresponding to cotectics and/or eutectics in the base system $CaO-Al_2O_3-SiO_2$. The viscosity curves of the glasses in this series do not vary significantly, thus these changes in liquidus temperatures are the primary drivers for increases in liquidus viscosity.

Because of their negative impact on thin film transistor (TFT) performance, alkalis such as lithia, soda or potash are excluded from the present glass compositions. Likewise, heavier alkaline earth metals (SrO and BaO) will be either minimized or excluded because of their negative impact on the glass density. Accordingly, the glasses of the present invention may include 0-5 mol % SrO. However, the glasses of the invention are essentially free of BaO. As used herein, essentially free of BaO means that the composition contains less than 0.1 mol % of BaO in the composition.

Fining agents such as $As_2O_3$, $Sb_2O_3$, $CeO_2$, $SnO_2$, Cl, F, $SO_2$, etc. may also be present to aid in the removal of seeds from the glass. The glass may also contain contaminants as typically found in commercially prepared glasses. In addition, the following oxides can be added at a level not exceeding 1 mol % without pushing properties outside of the ranges described above: $TiO_2$, $ZnO$, $ZrO_2$, $Y_2O_3$, $La_2O_3$. Table I lists examples of glasses of the present invention in terms of mol % along with their physical properties. The comparative example in Table 1 is Corning Incorporated's 1737 glass.

The invention is further illustrated by the following examples, which are meant to be illustrative, and not in any way limiting, to the claimed invention. TABLE I sets forth exemplary glass compositions in mol percent, as calculated on an oxide basis from the glass batches. These example glasses were prepared by melting 1,000-25,000 gram batches of each glass composition at a temperature and time to result in a relatively homogeneous glass composition, e.g. at a temperature of about 1625° C. for a period of about 4-16 hours in platinum crucibles. Also set forth are relevant glass properties for each glass composition, determined on the glasses in accordance with techniques conventional in the glass art. Thus, the linear coefficient of thermal expansion (CTE) over the temperature range 0-300° C. is expressed in terms of $\times 10^{-7}$/° C., the softening point (Soft. Pt.), and the annealing point (Ann. Pt.), and strain point (Str. Pt.) are expressed in terms of ° C. These were determined from fiber elongation techniques (ASTM references E228-85, C338, and C336, respectively). The density (Den.), in terms of $g/cm^3$, was measured via the Archimedes method (ASTM C693).

The 200 poise temperature (Melt. Temp., ° C.) (defined as the temperature at which the glass melt demonstrates a viscosity of 200 poises [20 Pa. s]) was calculated employing the Fulcher equation fit to the high temperature viscosity data (measure via rotating cylinders viscometry, ASTM C965-81). The liquidus temperature (Liq. Temp.) of the glass was measured using the standard liquidus method. This involves placing crushed glass particles in a platinum boat, placing the boat in a furnace having a region of gradient temperatures, heating the boat in an appropriate temperature region for 24 hours, and determining by means of microscopic examination the highest temperature at which crystals appear in the interior of the glass. The liquidus viscosity (Liq. Visc., in poises) was determined from this temperature and the coefficients of the Fulcher equation.

Table I records a number of glass compositions, expressed in terms of parts by mole on the oxide basis, illustrating the compositional parameters of the present invention. Inasmuch as the sum of the individual constituents totals or very closely approximates 100, for all practical purposes the reported values may be deemed to represent mole percent. The actual batch ingredients may comprise any materials, either oxides, or other compounds, which, when melted together with the other batch components, will be converted into the desired oxide in the proper proportions. For example, $SrCO_3$ and $CaCO_3$ can provide the source of SrO and CaO, respectively.

Glasses having the compositions and properties shown in Examples 14 and 19 are currently regarded as representing the best mode of the invention, that is, as providing the best combination of properties for the purposes of the invention at this time.

Although the invention has been described in detail for the purpose of illustration, it is understood that such detail is solely for that purpose and variations can be made therein by those skilled in the art without departing from the spirit and scope of the invention which is defined by the following claims.

TABLE 1

| Composition Batched (mol %) | 1 | 2 | 3 | 4 | 5 | 6 | 7 | 8 |
|---|---|---|---|---|---|---|---|---|
| $SiO_2$ | 69.75 | 69.78 | 69.75 | 69.8 | 70.7 | 70.57 | 69.1 | 70.85 |
| $Al_2O_3$ | 10.2 | 10.2 | 10.3 | 10.3 | 10 | 9.77 | 10.35 | 9.5 |
| $B_2O_3$ | 9.7 | 9.7 | 9.5 | 9.5 | 10 | 9.95 | 10.25 | 10.1 |
| MgO | 0.8 | 0.8 | 0.8 | 0.8 | | 0.12 | 0.15 | 1.25 |
| CaO | 7 | 7 | 8.5 | 8.5 | 9 | 9.17 | 9.8 | 6.7 |
| SrO | 2.2 | 2.2 | 0.8 | 0.8 | | | | 1.3 |
| BaO | | | | | | | | |
| $As_2O_3$ | | 0.3 | | 0.3 | | 0.4 | 0.33 | |
| $Sb_2O_3$ | 0.3 | | 0.3 | | 0.3 | | | 0.1 |
| $CeO_2$ | | | | | | | | 0.2 |
| $Y_2O_3$ | | | | | | | | |

TABLE 1-continued

| Composition Batched (mol %) | 1 | 2 | 3 | 4 | 5 | 6 | 7 | 8 |
|---|---|---|---|---|---|---|---|---|
| $SnO_2$ | 0.05 | 0.02 | 0.05 | | 0.05 | 0.02 | 0.02 | |
| Cl | 0.2 | 0 | 0.2 | | 0.2 | | | 0.2 |
| $RO/Al_2O_3$ | 0.98 | 0.98 | 0.98 | 0.98 | 0.90 | 0.95 | 0.96 | 0.98 |
| CTE (0-300° C., ×10$^{-7}$/° C.) | 32.7 | 31.2 | 31.9 | 30.8 | 30.5 | 30.2 | 31.5 | 31.4 |
| Dens. (g/cm$^3$) | 2.416 | 2.404 | 2.394 | 2.38 | 2.37 | 2.355 | 2.375 | 2.367 |
| Str. Pt (° C.) | 672 | 674 | 673 | 679 | 671 | 666 | 673 | 664 |
| Ann. Pt. (° C.) | 727 | 731 | 729 | 734 | 728 | 729 | 729 | 720 |
| Soft. Pt. (° C.) | 984 | 991 | 991 | 995 | 1001 | 1001 | 976 | 992 |
| 110 BHF (mg/cm$^2$) | 0.15 | 0.14 | 0.145 | 0.135 | 0.14 | 0.15 | 0.18 | 0.27 |
| Liq. Temp. (° C.) | 1125 | 1120 | 1120 | 1125 | 1150 | 1135 | 1115 | 1140 |
| Liq. Visc. (p) | 5.04E+05 | 7.06E+05 | 6.34E+05 | 6.30E+05 | 3.66E+05 | 5.95E+05 | 5.30E+05 | 4.77E+05 |
| Melt. Temp. (° C.) | 1659 | 1668 | 1650 | 1659 | 1668 | 1680 | 1635 | 1686 |

| Composition Batched (mol %) | 9 | 10 | 11 | 12 | 13 | 14 | 15 | 16 | 17 |
|---|---|---|---|---|---|---|---|---|---|
| $SiO_2$ | 69.1 | 69.65 | 68.75 | 69.1 | 68.8 | 69.33 | 69.65 | 70.05 | 69.33 |
| $Al_2O_3$ | 10.35 | 10.1 | 10.55 | 10.2 | 10.35 | 10.55 | 10.2 | 9.9 | 10.55 |
| $B_2O_3$ | 10.25 | 10.25 | 10.25 | 10.55 | 10.55 | 9.97 | 10.25 | 10.25 | 9.97 |
| MgO | 0.15 | 0.15 | 0.15 | 0.15 | 0.15 | 0.18 | 0.15 | 0.15 | 0.18 |
| CaO | 9.3 | 9.45 | 9.9 | 9.65 | 9.8 | 9.08 | 8.85 | 9.25 | 9.58 |
| SrO | 0.5 | | | | | 0.5 | 0.5 | | |
| BaO | | | | | | | | | |
| $As_2O_3$ | 0.33 | 0.4 | 0.4 | 0.33 | 0.33 | 0.37 | 0.4 | 0.4 | 0.37 |
| $Sb_2O_3$ | | | | | | | | | |
| $CeO_2$ | | | | | | | | | |
| $Y_2O_3$ | | | | | | | | | |
| $SnO_2$ | 0.02 | 0.02 | 0.02 | 0.02 | 0.02 | 0.02 | 0.02 | 0.02 | 0.02 |
| Cl | | | | | | | | | |
| $RO/Al_2O_3$ | 0.96 | 0.95 | 0.95 | 0.96 | 0.96 | 0.93 | 0.93 | 0.95 | 0.93 |
| CTE (0-300° C., ×10$^{-7}$/° C.) | 32.2 | 31.4 | 31.8 | 32 | 31.8 | 31.5 | 30.9 | 30.8 | 31.4 |
| Dens. (g/cm$^3$) | 2.377 | 2.366 | 2.371 | 2.364 | 2.366 | 2.376 | 2.369 | 2.357 | 2.366 |
| Str. Pt (° C.) | 671 | 669 | 674 | 666 | 667 | 676 | 671 | 668 | 674 |
| Ann. Pt. (° C.) | 727 | 725 | 729 | 722 | 723 | 731 | 728 | 726 | 730 |
| Soft. Pt. (° C.) | 983 | 985 | 986 | 980 | 980 | 980 | 985 | 987 | 992 | 987 |
| 110 BHF (mg/cm$^2$) | 0.15 | | | | | 0.12 | 0.12 | | |
| Liq. Temp. (° C.) | 1095 | 1090 | 1100 | 1090 | 1115 | 1095 | 1100 | 1100 | 1120 |
| Liq. Visc. (p) | 1.05E+06 | 1.23E+06 | 9.19E+05 | 1.07E+06 | 5.74E+05 | 1.19E+06 | 1.04E+06 | 1.12E+06 | 6.23E+05 |
| Melt. Temp. (° C.) | 1649 | 1654 | 1650 | 1642 | 1650 | 1651 | 1657 | 1674 | 1654 |

| Composition Batched (mol %) | 18 | 19 | 20 | 21 | 22 | 23 | 24 | 25 | 26 |
|---|---|---|---|---|---|---|---|---|---|
| $SiO_2$ | 69.45 | 69.33 | 68.3 | 70.45 | 70 | 70.4 | 70.1 | 70 | 68.3 |
| $Al_2O_3$ | 11 | 10.55 | 10.9 | 9.85 | 10.35 | 10.05 | 10 | 10.23 | 10.9 |
| $B_2O_3$ | 9 | 9.97 | 10.4 | 9.55 | 9.5 | 9.69 | 9.75 | 10.15 | 10.4 |
| MgO | | 0.18 | | 1.1 | 0.8 | 0.82 | 0.81 | 0.8 | |
| CaO | 10 | 9.08 | 9.1 | 5.75 | 8.5 | 7.14 | 7.11 | 7 | 9.1 |
| SrO | | 0.5 | 1 | 2.9 | 0.85 | 1.89 | 1.88 | 2.22 | 1.0 |
| BaO | | | | | | | | | |
| $As_2O_3$ | | | | 0.4 | | | | | 0.3 |
| $Sb_2O_3$ | 0.3 | 0.37 | 0.3 | | | | | | |
| $CeO_2$ | | | | | 0.2 | 0.2 | 0.2 | 0.2 | |
| $Y_2O_3$ | | | | | | | | | |
| $SnO_2$ | 0.05 | 0.02 | 0.05 | | | | | | 0.05 |
| Cl | 0.2 | | 0.2 | | | | | | |
| $RO/Al_2O_3$ | 0.91 | 0.93 | 0.93 | 0.99 | 0.98 | 0.98 | 0.98 | 0.98 | 0.93 |
| CTE (0-300° C., ×10$^{-7}$/° C.) | 32 | 31.9 | 34.8 | 33.4 | 32.8 | 33.5 | 32.9 | 33.4 | 34.5 |
| Dens. (g/cm$^3$) | 2.386 | 2.383 | 2.403 | 2.405 | 2.378 | 2.378 | 2.374 | 2.391 | 2.392 |
| Str. Pt (° C.) | 681 | 675 | 669 | 670 | 672 | 670 | 664 | 671 | 677 |
| Ann. Pt. (° C.) | 737 | 730 | 725 | 727 | 728 | 727 | 720 | 727 | 732 |
| Soft. Pt. (° C.) | 993 | 984 | 978 | 996 | 988 | 989 | 984 | 989 | 979 |
| 110 BHF (mg/cm$^2$) | | | 0.16 | 0.3 | 0.39 | 0.18 | 0.17 | 0.19 | 0.19 |
| Liq. Temp. (° C.) | 1150 | 1100 | 1140 | 1165 | 1160 | 1140 | 1150 | 1150 | 1150 |
| Liq. Visc. (p) | 2.90E+05 | 1.06E+06 | 2.40E+05 | 2.88E+05 | 2.49E+05 | 4.29E+05 | 2.80E+05 | 3.11E+05 | 2.14E+05 |
| Melt. Temp. (° C.) | 1642 | 1655 | 1617 | 1682 | 1656 | 1668 | 1653 | 1656 | 1620 |

| Composition Batched (mol %) | 27 | 28 | 29 | 30 | 31 | 32 | Comp Ex |
|---|---|---|---|---|---|---|---|
| $SiO_2$ | 68 | 70 | 70.4 | 69.8 | 71 | 72 | 67.6 |
| $Al_2O_3$ | 10.5 | 10 | 10.2 | 10.6 | 9.9 | 9.33 | 11.4 |
| $B_2O_3$ | 11 | 10 | 9.1 | 9 | 10 | 10 | 8.5 |
| MgO | | | | | | | 1.3 |
| CaO | 10.5 | 9 | 5.68 | 7.14 | 9.1 | 8.66 | 5.2 |
| SrO | | | 4.55 | 3.42 | | | 1.3 |
| BaO | | | | | | | 4.3 |
| $As_2O_3$ | | | | | | | 0.4 |

TABLE 1-continued

| | | | | | | | |
|---|---|---|---|---|---|---|---|
| Sb$_2$O$_3$ | 0.3 | 0.3 | 0.3 | 0.3 | 0.3 | 0.3 | |
| CeO$_2$ | | | | | | | |
| Y$_2$O$_3$ | | | | | | | |
| SnO$_2$ | | | | | | | |
| Cl | | | | | | | |
| RO/Al$_2$O$_3$ | 1.00 | 0.90 | 1.00 | 1.00 | 0.92 | 0.93 | 1.03 |
| CTE (0-300° C., ×10$^{-7}$/° C.) | 34.9 | 32.0 | 34.4 | 34.4 | 32.1 | 31.2 | 37.8 |
| Dens. (g/cm$^3$) | 2.378 | 2.355 | 2.420 | 2.406 | 2.353 | 2.342 | 2.54 |
| Str. Pt (° C.) | 659 | 673 | 669 | 672 | 669 | 672 | 666 |
| Ann. Pt. (° C.) | 713 | 731 | 727 | 729 | 726 | 730 | 721 |
| Soft. Pt. (° C.) | 967 | 999 | 987 | 984 | 998 | 1012 | 975 |
| 110 BHF (mg/cm$^2$) | 0.23 | 0.18 | | | | | 0.2 |
| Liq. Temp. (° C.) | 1120 | 1130 | 1130 | 1135 | 1120 | 1125 | 1050 |
| Liq. Visc. (p) | 3.07E+05 | 5.99E+05 | 5.67E+05 | 4.38E+05 | 8.46E+05 | 8.79E+05 | 2.97E+06 |
| Melt. Temp. (° C.) | 1611 | 1670 | 1671 | 1657 | 1685 | 1703 | 1636 |

What is claimed is:

1. An aluminosilicate glass comprising in mol percent on an oxide basis: 65-75 SiO$_2$, 7-13 Al$_2$O$_3$, and 5-15 B$_2$O$_3$, wherein:
   (a) said glass has a RO/Al$_2$O$_3$ ratio between 0.9 and 1.2, wherein R represents Mg, Ca, Sr, and Ba;
   (b) the glass has a CaO concentration between 5 mol percent and 15 mol percent on an oxide basis;
   (c) the glass has a MgO concentration between 0 mol percent and 3 mol percent on an oxide basis; and
   (d) the glass has a density less than about 2.45 gram/cm$^3$, a liquidus viscosity greater than about 200,000 poises, and a linear coefficient of thermal expansion over the temperature range from 0° C. to 300° C. between 28×10$^{-7}$/° C. and 35×10$^{-7}$/° C.

2. A glass according to claim 1 wherein the glass comprises in mol percent on an oxide basis: 67-73 SiO$_2$, 8-11.5 Al$_2$O$_3$, 8-12 B$_2$O$_3$, and 5.5-11 CaO.

3. A glass according to claim 1 wherein the RO/Al$_2$O$_3$ ratio is between 0.92 and 0.96, wherein R represents Mg, Ca, Sr, and Ba.

4. A glass according to claim 1 wherein the glass has a strain point greater than about 650° C.

5. A glass according to claim 1 wherein the glass has a strain point greater than about 660° C.

6. A glass according to claim 1 wherein the glass has a melting temperature less than about 1700° C.

7. A glass according to claim 1 wherein the glass exhibits a weight loss of less than 0.5 mg/cm$^2$ after immersion in a solution of 1 part 50 wt. % HF and 10 parts 40 wt. % NH$_4$F for 5 minutes at 30° C.

8. A glass according to claim 1 wherein the glass has a liquidus viscosity greater than about 400,000 poises.

9. A glass according to claim 1 wherein the glass has a liquidus viscosity greater than about 600,000 poises.

10. A glass according to claim 1 wherein the glass has a liquidus viscosity greater than about 800,000 poises.

11. A glass according to claim 1 wherein the glass has a density less than about 2.40 gram/cm$^3$.

12. A glass according to claim 1 wherein the glass has a linear coefficient of thermal expansion over the temperature range from 0° C. to 300° C. between 28×10$^{-7}$/° C. and 33×10$^{-7}$/° C.

13. A glass according to claim 1 wherein the glass comprises less than about 0.1 mol percent BaO.

14. A glass according to claim 1 wherein the glass comprises less than about 0.1 mol percent of alkali metal oxides.

15. A glass according to claim 1 wherein the glass has a liquidus viscosity greater than about 400,000 poises, a density less than about 2.45 gram/cm$^3$, and a strain point greater than about 650° C.

16. A glass according to claim 1 wherein the glass has a liquidus viscosity greater than about 600,000 poises, a density less than about 2.45 gram/cm$^3$, and a strain point greater than about 650° C.

17. A glass according to claim 1 wherein the glass has a liquidus viscosity greater than about 800,000 poises, a density less than about 2.45 gram/cm$^3$, and a strain point greater than about 650° C.

18. In a flat panel display device, the improvement comprising a substrate comprising the glass of claim 1.

19. The flat panel display device of claim 18 wherein the substrate has an average surface roughness less than about 0.5 nm.

20. The flat panel display device of claim 18 wherein the substrate has an average internal stress less than about 150 psi.

* * * * *